United States Patent
Mao

(10) Patent No.: US 12,186,816 B2
(45) Date of Patent: Jan. 7, 2025

(54) CUTTING INSERT, CUTTING TOOL AND METHOD FOR MANUFACTURING MACHINED PRODUCT

(71) Applicant: KYOCERA CORPORATION, Kyoto (JP)

(72) Inventor: Shohei Mao, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 850 days.

(21) Appl. No.: 17/289,728

(22) PCT Filed: Oct. 28, 2019

(86) PCT No.: PCT/JP2019/042173
§ 371 (c)(1),
(2) Date: Apr. 29, 2021

(87) PCT Pub. No.: WO2020/090738
PCT Pub. Date: May 7, 2020

(65) Prior Publication Data
US 2022/0001467 A1   Jan. 6, 2022

(30) Foreign Application Priority Data
Oct. 30, 2018   (JP) .................................. 2018-204271

(51) Int. Cl.
B23C 5/20    (2006.01)
B23C 5/10    (2006.01)

(52) U.S. Cl.
CPC ............... *B23C 5/109* (2013.01); *B23C 5/20* (2013.01); *B23C 5/202* (2013.01)

(58) Field of Classification Search
CPC ....... B23C 5/1027; B23C 5/109; B23C 5/202; B23C 2200/20; B23C 2200/28; B23C 2200/367
See application file for complete search history.

(56) References Cited

U.S. PATENT DOCUMENTS 9,744,597 B2 *  8/2017  Wernh ................. B23B 27/145
10,076,795 B2 *  9/2018  Dagan ....................... B23C 5/02
(Continued)

FOREIGN PATENT DOCUMENTS

EP          0505574 A1    9/1992
JP          H3117505 U   12/1991
(Continued)

*Primary Examiner* — Nicole N Ramos
(74) *Attorney, Agent, or Firm* — HAUPTMAN HAM, LLP

(57) ABSTRACT

A cutting insert may include a base including a first surface, a second surface and a lateral surface. The first surface may include a first corner, a second corner and a first side. The first side may include a first portion, a second portion, a third portion and a fourth portion in this order in a direction from the first corner to the second corner. An imaginary straight line being in contact with the first portion may be a reference line in a front view of the first surface. Inclination angles of the first portion, the second portion, the third portion and the fourth portion relative to the reference line may be respectively a first angle, a second angle, a third angle and a fourth angle. The third angle may be smaller than each of the second angle and the fourth angle.

20 Claims, 16 Drawing Sheets

(56) References Cited

U.S. PATENT DOCUMENTS

| | | | |
|---|---|---|---|
| 2008/0044241 A1* | 2/2008 | Koskinen | B23C 5/2213 |
| | | | 407/103 |
| 2011/0052337 A1* | 3/2011 | Dudzinsky | B23C 5/006 |
| | | | 407/40 |
| 2012/0195700 A1 | 8/2012 | Chen et al. | |
| 2012/0269588 A1 | 10/2012 | Kaufmann | |
| 2013/0108387 A1 | 5/2013 | Ishi et al. | |
| 2017/0368616 A1 | 12/2017 | Rue et al. | |
| 2019/0030626 A1* | 1/2019 | Morisaki | B23C 5/20 |

FOREIGN PATENT DOCUMENTS

| | | |
|---|---|---|
| JP | H516011 A | 1/1993 |
| JP | 2008229745 A | 10/2008 |
| JP | 2014503375 A | 2/2014 |
| JP | 2018506437 A | 3/2018 |
| WO | 2012014977 A1 | 2/2012 |
| WO | 2012104832 A1 | 8/2012 |

\* cited by examiner

CUTTING INSERT, CUTTING TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/042173 filed on Oct. 28, 2019, which claims priority to Japanese Application No. 2018-204271 filed on Oct. 30, 2018, which are entirely incorporated herein by reference.

TECHNICAL FIELD

The present disclosure generally may relate to a cutting insert for use in a cutting process of a workpiece, a cutting tool and a method for manufacturing a machined product. Specifically, the present disclosure may relate to a cutting tool for use in a tool rotating cutting process, such as a milling process.

BACKGROUND

For example, a cutting insert may be discussed in WO 2012/104832 (Patent Document 1) and may be used as a cutting insert for use in a cutting process of a workpiece, such as metal. The cutting insert discussed in Patent Document 1 may have a quadrangular plate shape including two lateral surfaces and a peripheral surface located between these lateral surfaces. The peripheral surface may include four identical end surfaces. These four end surfaces individually may include a rake surface.

In cases where the peripheral surface includes the end surfaces as in the cutting insert discussed in Patent Document 1, it may be difficult to ensure durability of cutting edges located on outer peripheral edges of the individual end surfaces, and it may also be difficult to ensure space that permits passage of chips generated by the cutting edges. Hence, there has been a desire to improve both the durability of the cutting edges and chip discharge performance.

SUMMARY

A cutting insert in a non-limiting aspect of the present disclosure may include a base including a first surface, a second surface and a lateral surface. The first surface may have a polygonal shape. The second surface may be located on a side opposite to the first surface. The lateral surface may be located between the first surface and the second surface. The first surface may include a first corner, a second corner and a first side. The second corner may be located adjacent to the first corner. The first side may be located between the first corner and the second corner. The lateral surface may include a first lateral surface. The first lateral surface may be located from the first side to the second surface, and may include a first rake surface region.

The first side may include a first portion, a second portion, a third portion and a fourth portion. The first portion may be extended from the first corner toward the second corner. The second portion may be located closer to the second corner than the first portion. The third portion may be located closer to the second corner than the second portion. The fourth portion may be extended from the second corner toward the first corner. An imaginary straight line being in contact with the first portion at an end portion on a side of the first corner may be a reference line in a front view of the first surface. The second portion and the fourth portion may be individually inclined relative to the reference line so as to be located away from the reference line on a side where a center of the first surface is located, as going away from the first portion. An inclination angle of the first portion relative to the reference line may be a first angle, an inclination angle of the second portion relative to the reference line may be a second angle, an inclination angle of the third portion relative to the reference line may be a third angle, and an inclination angle of the fourth portion relative to the reference line may be a fourth angle. The third angle may be smaller than each of the second angle and the fourth angle.

EMBODIMENTS

Figure 1:
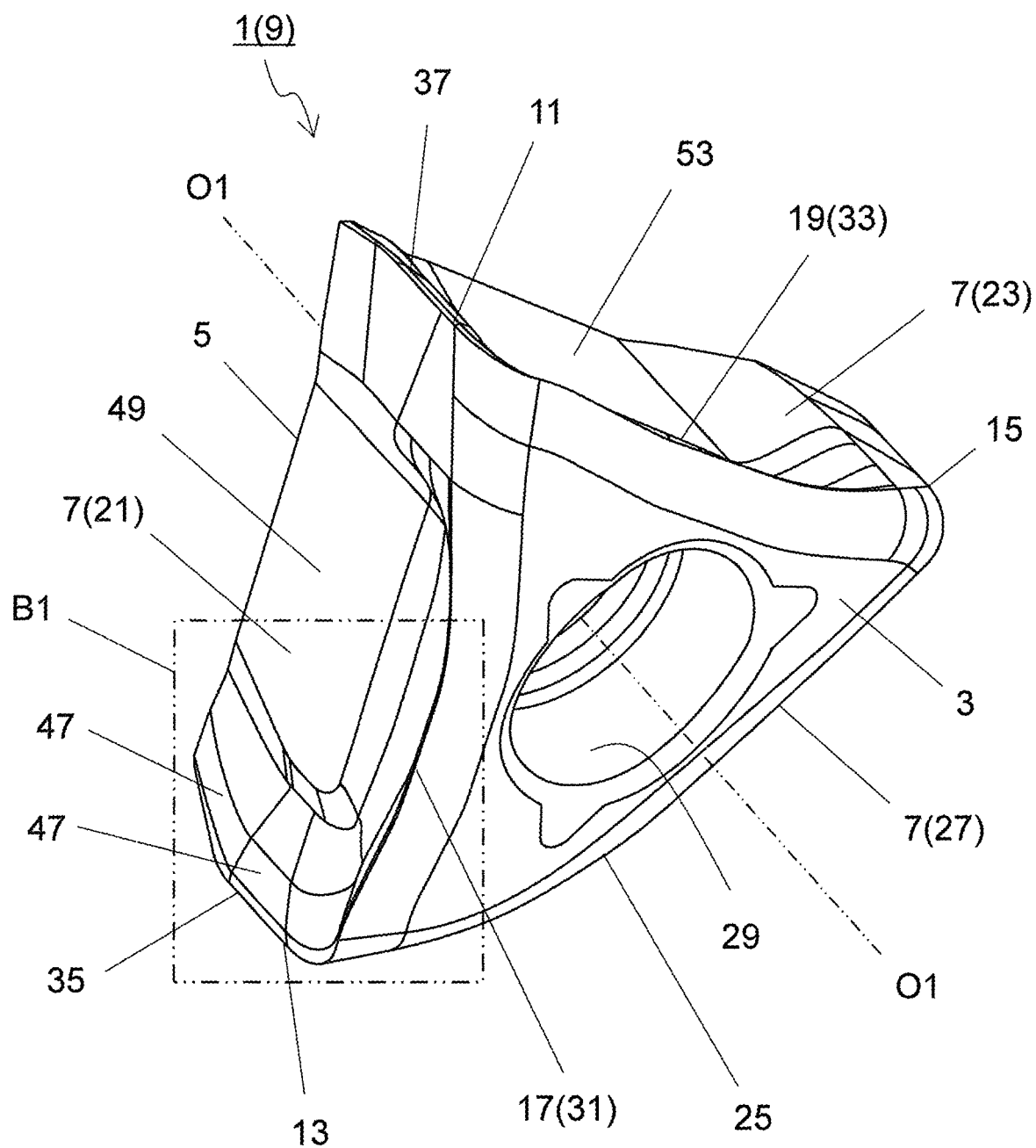
FIG. 1 is a perspective view illustrating a cutting insert of a non-limiting aspect of the present disclosure.

Cutting inserts 1 in embodiments may be described in detail below with reference to the drawings. For the sake of description, the drawings referred to in the following may illustrate, in simplified form, only main members necessary for describing the embodiments. The following cutting inserts 1 may therefore be capable of including any arbitrary structural member not illustrated in the drawings referred to. Dimensions of the members in each of the drawings faithfully may represent neither dimensions of actual structural members nor dimensional ratios of these members.

<Cutting Inserts>

Figure 2:
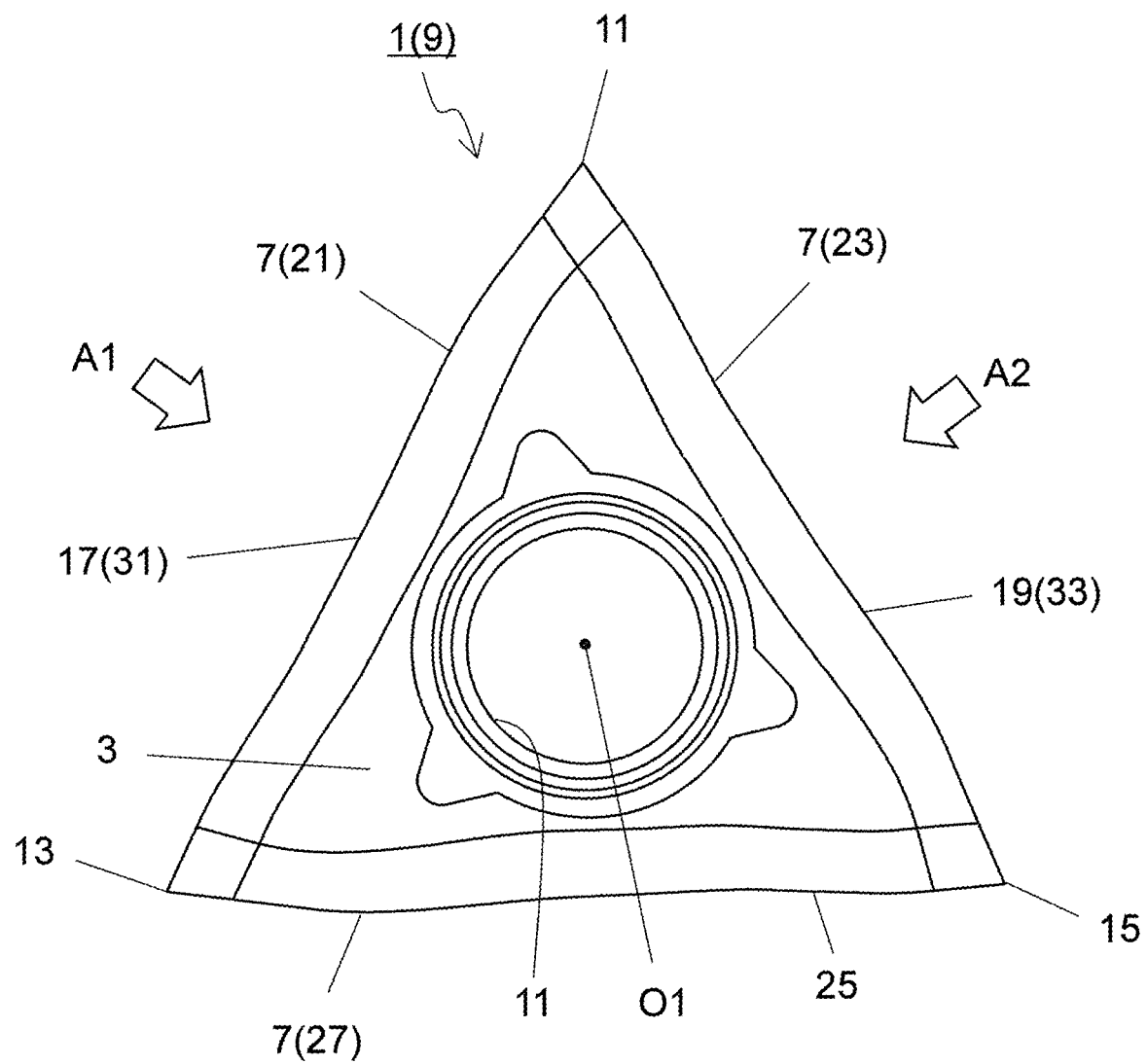
FIG. 2 is a front view of the cutting insert illustrated in FIG. 1 as viewed from a side of a first surface.

The cutting insert 1 (hereinafter also referred to simply as "insert 1") may include a base 9 including, for example, a first surface 3, a second surface 5 and a lateral surface 7 as illustrated in FIG. 1. The first surface 3 may have a polygonal shape including a plurality of corners and a plurality of sides as illustrated in FIG. 2. The second surface 5 may be located on a side opposite to the first surface 3, and may include a plurality of corners and sides as in the first surface 3. Accordingly, the insert 1 may have a polygonal plate shape as illustrated in FIG. 1.

The first surface 3 may have an approximately triangular shape, and may include three corners and three sides as illustrated in FIG. 2. Similarly to the first surface 3, the second surface 5 may have an approximately triangular shape and may include three corners and three sides. The three corners and the three sides of the first surface 3 may be located so as to have rotational symmetry of 120° around a central axis O1 in a front view of the first surface 3.

Although the second surface 5 has the polygonal shape as in the first surface 3, there is no limitations to dimensions identical to those of the first surface 3. For example, the second surface 5 may be somewhat smaller than the first surface 3. As used herein, the polygonal shape is not limited to a strict polygonal shape. For example, the three sides of the first surface 3 may not be individually a strict straight line.

Each of the three sides may include a part protruded outward and a part protruded inward as in the embodiment illustrated in FIG. 2. As used herein, the term "central axis O1" may be rephrased as an imaginary straight line connecting a center of the first surface 3 and a center of the second surface 5. The center of the first surface 3 may be determined, for example, by a position of a center of gravity of the first surface 3 in the front view of the first surface 3.

The shapes of the first surface 3 and the second surface 5 are not limited to the above shape. The first surface 3 may have an approximately triangular shape as illustrated in FIG. 1. Alternatively, the first surface 3 and the second surface 5 may have, for example, a quadrangular shape, pentagonal shape, hexagonal shape or octagonal shape.

The first surface 3 may include a first corner 11, a second corner 13, a third corner 15, a first side 17 and a second side 19. The second corner 13 and the third corner 15 may be individually located adjacent to the first corner 11. The first side 17 may be located between the first corner 11 and the second corner 13. In other words, the first side 17 may connect to the first corner 11 and the second corner 13. The second side 19 may be located between the first corner 11 and the third corner 15. In other words, the second side 19 may connect to the first corner 11 and the third corner 15.

The lateral surface 7 may be located between the first surface 3 and the second surface 5 in the present disclosure. The lateral surface 7 may connect to the first surface 3 and the second surface 5 in the embodiment illustrated in FIG. 1. Because the first surface 3 may include the first side 17 and the second side 19, the lateral surface 7 may include a first lateral surface 21 located along the first side 17 and a second lateral surface 23 located along the second side 19.

As in the embodiment illustrated in FIG. 1, the first lateral surface 21 may be located from the first side 17 to the second surface 5, and the second lateral surface 23 may be located from the second side 19 to the second surface 5. Because the first side 17 and the second side 19 may be located adjacent to each other as described above, the first lateral surface 21 and the second lateral surface 23 may also be located adjacent to each other.

The first lateral surface 21 may include a first rake surface region. The second lateral surface 23 may include a second rake surface region. The first lateral surface 21 and the second lateral surface 23 may be individually servable as a rake surface in a cutting process.

Because the first surface 3 has the approximately triangular shape as in the embodiment illustrated in FIG. 2, the first surface 3 may include a third side 25 in addition to the first side 17 and the second side 19, and the lateral surface 7 may further include a third lateral surface 27 located from the third side 25 to the second surface 5, in addition to the first lateral surface 21 and the second lateral surface 23. The third side 25 may be located between the second corner 13 and the third corner 15 in the embodiment illustrated in FIG. 2.

As described above, the three corners and the three sides of the first surface 3 may be located so as to have rotational symmetry of 120° around the central axis O1 in the front view of the first surface 3 as in the embodiment illustrated in FIG. 2. Additionally, the first lateral surface 21, the second lateral surface 23 and the third lateral surface 27 may also be located so as to have rotational symmetry of 120° around the central axis O1.

The whole of an intersection of the first surface 3 and the lateral surface 7 need not be a ridgeline. For example, a part of the intersection of the first surface 3 and the lateral surface 7 where a cutting edge is formed may correspond to the ridgeline, and a part of the intersection of the first surface 3 and the lateral surface 7 where no cutting edge is formed may not be the ridgeline. In other words, the first surface 3 may smoothly connect to the lateral surface 7 in the part of the intersection of the first surface 3 and the lateral surface 7 where no cutting edge is formed.

A visible range in the front view of the first surface 3 may correspond to the first surface 3. Therefore, the first corner 11, the second corner 13, the third corner 15, the first side 17, the second side 19 and the third side 25 may be located on an outer peripheral edge of the first surface 3 in the front view of the first surface 3. This may make it possible to determine a boundary between the first surface 3 and the lateral surface 7 even if a portion of an outer peripheral part of the first surface 3 is curved in a convex curved surface shape so as to obtain a partial smooth connection of the first surface 3 and the lateral surface 7 as in the embodiment illustrated in FIG. 1.

A maximum width of the first surface 3 may be, for example, 6-25 mm in the front view of the first surface 3. A height from the first surface 3 to the second surface 5 may be, for example, 1-10 mm. As used herein, the term "height from the first surface 3 to the second surface 5" may denote a maximum value of a distance between the first surface 3 and the second surface 5 in a direction parallel to the central axis O1.

The insert 1 may include a through hole 29 that opens into the first surface 3 as illustrated in FIG. 1. The through hole 29 may be formed from the center of the first surface 3 toward the center of the second surface 5 in the embodiment illustrated in FIG. 1. Therefore, the through hole 29 may open into the second surface 5. Alternatively, a central axis of the through hole 29 may coincide with the central axis O1 if the through hole 29 is formed from the center of the first surface 3 toward the center of the second surface 5 as in the embodiment illustrated in FIG. 1.

The through hole 29 may be used to insert, for example, a screw if fixing the insert 1 to the holder. Instead of the screw, for example, a clamping member may be used to fix the insert 1 to the holder. Although the through hole 29 is formed from the center of the first surface 3 toward the center of the second surface 5 in the embodiment illustrated in FIG. 1, the through hole 29 is not limited to the above configuration.

Figure 3:
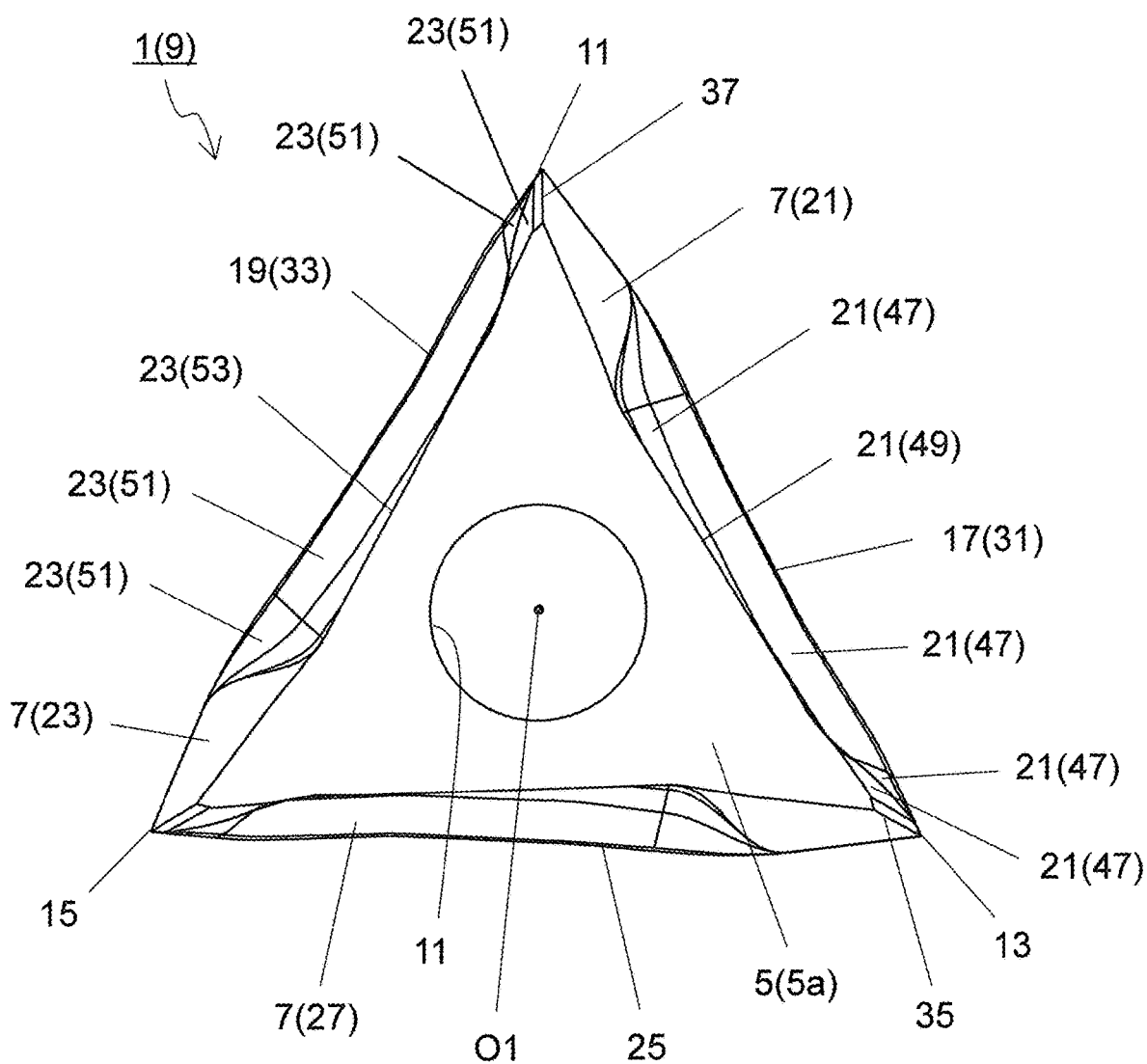
FIG. 3 is a front view of the cutting insert illustrated in FIG. 1 as viewed from a side of a second surface.

As illustrated in FIG. 3, the second surface 5 may include a flat surface region 5a located so as to surround an opening of the through hole 29. If the second surface 5 includes the surface region 5a, the insert 1 may be stably fixable to the holder. The surface region 5a is not limited to a strict flat surface.

The surface region 5a may be approximately flat, and specifically may be slightly curved or may have slight irregularities, both of which are unremarkable on the whole. More specifically, the surface region 5a may include, for example, slight irregularities of approximately several tens of μm.

The surface region 5a may be orthogonal to the central axis O1. The insert 1 may be more stably fixable to the holder if the surface region 5a is orthogonal to the central axis. If the second surface 5 includes the surface region 5a, the surface region 5a may be used as a first reference plane in order to determine a positional relationship in a direction along the central axis O1.

The base 9 may further include a first cutting edge 31, a second cutting edge 33, a third cutting edge 35 and a fourth cutting edge 37. These cutting edges may be used to cut out a workpiece if the insert 1 is used to manufacture a machined product. The first cutting edge 31 may be located on the first side 17. The second cutting edge 33 may be located on the second side 19.

The first cutting edge 31 may be located on a whole of the first side 17, or may be located on a part of the first side 17. The second cutting edge 33 may be located on a whole of the second side 19, or may be located on a part of the second side 19.

The first cutting edge 31 may be located on the whole of the first side 17, or may be located only on the part of the first side 17. The second cutting edge 33 may be located on the whole of the second side 19, or may be located only on the part of the second side 19.

The third cutting edge 35 may be extended from the second corner 13 toward the second surface 5. The fourth cutting edge 37 may be extended from the first corner 11 toward the second surface 5. The third cutting edge 35 may be located on an intersection of the first lateral surface 21 and the third lateral surface 27 as in the embodiment illustrated in FIG. 1. The fourth cutting edge 37 may be located on an intersection of the first lateral surface 21 and the second lateral surface 23 as in the embodiment illustrated in FIG. 1.

The third cutting edge 35 may connect to the second surface 5 or may be located away from the second surface 5. Similarly, the fourth cutting edge 37 may connect to the second surface 5 or may be located away from the second surface 5.

For example, if a cutting process of a workpiece is carried out using the insert 1 in a state where the first lateral surface 21 serves as a rake surface, the third cutting edge 35 may be used as a bottom cutting edge, and the first cutting edge 31 may be used as an outer peripheral cutting edge. In cases where the third cutting edge 35 is used as the bottom cutting edge and the first cutting edge 31 is used as the outer peripheral cutting edge as described above, the first cutting edge 31 may mainly contribute to the cutting process. The first cutting edge 31 may be called a main cutting edge in some cases.

If a cutting process of a workpiece is carried out using the insert 1 in a state where the second lateral surface 23 serves as a rake surface, the fourth cutting edge 37 may be used as a bottom cutting edge, and the second cutting edge 33 may be used as an outer peripheral cutting edge. In cases where the fourth cutting edge 37 is used as the bottom cutting edge and the second cutting edge 33 is used as the outer peripheral cutting edge as described above, the second cutting edge 33 may mainly contribute to the cutting process. The second cutting edge 33 may also be called a main cutting edge in some cases.

If the three sides of the first surface 3 are located so as to have rotational symmetry of 120° around the central axis O1, a cutting edge part corresponding to the first cutting edge 31 may be located on the third side 25. If the first lateral surface 21, the second lateral surface 23 and the third lateral surface 27 are located so as to have rotational symmetry of 120° around the central axis O1, a cutting edge part corresponding to the third cutting edge 35 may be located on an intersection of the second lateral surface 23 and the third lateral surface 27.

The first side 17 may include a first portion 39, a second portion 41, a third portion 43 and a fourth portion 45. The first portion 39 may be extended from the first corner 11 toward the second corner 13. The second portion 41 may be located closer to the second corner 13 than the first portion 39.

The third portion 43 may be located closer to the second corner 13 than the second portion 41. The fourth portion 45 may be extended from the second corner 13 toward the first corner 11. The first portion 39, the second portion 41, the third portion 43 and the fourth portion 45 may be located in this order in a direction from the first corner 11 to the second corner 13 on the first side 17.

FIG. 2 may illustrate a reference line L. The reference line L may be an imaginary straight line that is in contact with the first portion 39 at an end portion on a side of the first corner 11 in the front view of the first surface 3. The second portion 41 and the fourth portion 45 may be inclined relative to the reference line L so as to be located away from the reference line L on a side where the center of the first surface 3 is located, as going away from the first portion 39. Specifically, the second portion 41 and the fourth portion 45 may be located away from the reference line L toward a right side as going away from the first portion 39 in the front view of the first surface 3 as illustrated in FIG. 2.

FIG. 2 may illustrate a first angle θ1, a second angle θ2, a third angle θ3 and a fourth angle θ4. The first angle θ1 may be an inclination angle of the first portion 39 with respect to the reference line L. The second angle θ2 may be an inclination angle of the second portion 41 with respect to the reference line L. The third angle θ3 may be an inclination angle of the third portion 43 with respect to the reference line L. The fourth angle θ4 may be an inclination angle of the fourth portion 45 with respect to the reference line L.

If the inclination angle of the first portion 39 is not kept constant, a maximum value thereof may be employed as the first angle θ1. Similarly, if the inclination angles of the second portion 41, the third portion 43 and the fourth portion 45 are not kept constant, their individual maximum values may be respectively employed as the second angle θ2, the third angle θ3 and the fourth angle θ4. As described above, the reference line L may be in contact with the first portion 39 at the end portion on the side of the first corner 11 in the front view of the first surface 3. Therefore, if the first portion 39 has a straight line shape, the first angle θ1 may be 0°.

The third angle θ3 may be smaller than each of the second angle θ2 and the fourth angle θ4. If the third angle θ3 is relatively smaller than each of the second angle θ2 and the fourth angle θ4, it may be easy to ensure space that permits passage of chips generated by the first cutting edge 31. This may lead to enhanced chip discharge performance, and chip clogging may be less likely to occur.

If the second angle θ2 is relatively larger than the third angle θ3, it may be easy to ensure a large length of the first cutting edge 31 without making the base 9 larger than necessary. This may make it possible to apply to, for example, high-cutting-depth process, thus leading to an increased degree of freedom in cutting process. If the fourth angle θ4 is relatively larger than the third angle θ3, it may be easy to ensure a large thickness of the base 9 located close to the third cutting edge 35. This may lead to enhanced durability of the third cutting edge 35.

The first angle θ1 may be smaller than each of the second angle θ2 and the fourth angle θ4. If the first angle θ1 is relatively smaller than each of the second angle θ2 and the fourth angle θ4, it may be easy to ensure a large thickness of the base 9 located close to the fourth cutting edge 37. Specifically, it may be easy to ensure a large angle at which the first lateral surface 21 intersects with the second lateral surface 23. This may lead to enhanced durability of the fourth cutting edge 37.

The third portion 43 may be inclined relative to the reference line L so as to be located away from the reference line L on the side where the center of the first surface 3 is located, as going way from the first portion 39. Specifically, the third portion 43 may be located away from the reference line L toward a right side as going away from the first portion 39 in the front view of the first surface 3 as illustrated in FIG. 2. If the third portion 43 is inclined as described above, it may be easy to ensure a larger space that permits passage of chips generated by the first cutting edge 31. This may lead to further enhanced chip discharge performance, and chip clogging may be much less likely to occur.

The fourth angle θ4 may be larger than the second angle θ2. In this case, it may be easy to ensure a larger thickness of the base 9 located close to the third cutting edge 35. This may lead to further enhanced durability of the third cutting edge 35.

The first angle θ1, the second angle θ2, the third angle θ3 and the fourth angle θ4 are not limited to a specific value. For example, the first angle θ1 may be set to approximately 0-10°. The second angle θ2 may be set to approximately 5-30°. The third angle θ3 may be set to approximately 3-15°. The fourth angle θ4 may be set to approximately 5-30°.

The first cutting edge 31 may be located on the whole of the first side 17 as described above, or alternatively may be located at the second portion 41, the third portion 43 and the fourth portion 45 as in the embodiment illustrated in FIG. 2. That is, the first cutting edge 31 may not be located at the first portion 39 on the first side 17.

If the first cutting edge 31 is not located at the first portion 39, the first surface 3 can smoothly connect to the lateral surface 7 at the first portion 39. Thus, the second cutting edge 33 can smoothly connect to the fourth cutting edge 37. In this case, any corner may be less likely to be formed in the vicinity of a boundary between the second cutting edge 33 and the fourth cutting edge 37, but a so-called corner cutting edge having a convex curvilinear shape can be formed in a front view of the second lateral surface 23.

The fourth portion 45 may have a convex curvilinear shape in a front view of the first lateral surface 21. The fourth portion 45 may be extended from the second corner 13 and may therefore connect to the third cutting edge 35. If the fourth portion 45 constituting a part of the first cutting edge 31 has the convex curvilinear shape, the fourth portion 45 may be servable as a corner cutting edge having enhanced durability. Hence, the first cutting edge 31 may have enhanced durability if the first cutting edge 31 and the third cutting edge 35 are used to carry out a cutting process.

The third portion 43 may have a straight line shape inclined so as to be located away from the second surface 5 as going away from the fourth portion 45 in the front view of the first lateral surface 21. If the third portion 43 is inclined as described above, chips may have a smaller thickness, thereby reducing a cutting load applied to the third portion 43. Additionally, if the third portion 43 has the straight line shape, the third portion 43 may have enhanced durability.

For example, a radial rake may be set to a negative value in order that the first surface 3 is less likely to come into contact with a workpiece if attaching the insert 1 to the holder. If the third portion 43 is inclined as described above, an angle formed by a machined surface of the workpiece formed by the third cutting edge 35 and a machined surface of the workpiece formed by the first cutting edge 31 can be brought close to 90°. This may make it possible to suitably carry out, for example, shoulder milling.

The second portion 41 may have a convex curvilinear shape in the front view of the first lateral surface 21. The first cutting edge 31 may have enhanced durability if a part of the first cutting edge 31 which is located on a most outer peripheral side has the above convex shape in a state where the insert 1 is attached to the holder.

The first portion 39 may have a straight line shape that is inclined so as to come closer to the second surface 5 as coming closer to the first corner 11 in the front view of the first lateral surface 21. If the first portion 39 is inclined as described above, the first portion 39 where the first cutting edge 31 is not located may less be likely to come into contact with the workpiece if the first cutting edge 31 is used to carry out the cutting process. Consequently, the second cutting edge 33 and the fourth cutting edge 37 that are located close to the first portion 39 may less be susceptible to damage.

Therefore, after the cutting process is carried out using the first cutting edge 31 and the third cutting edge 35, it may be possible to suitably carry out a cutting process using the second cutting edge 33 and the fourth cutting edge 37.

The first lateral surface 21 may include a first inclined surface 47 and a first flat surface 49. The first inclined surface 47 may be located along the first cutting edge 31 and the third cutting edge 35. The first inclined surface 47 may be inclined so as to come closer to a center of the base 9 as going away from the first cutting edge 31 and the third cutting edge 35, and may serve as a so-called rake surface. That is, the first inclined surface 47 may correspond to the first rake surface region described earlier.

Figure 4:
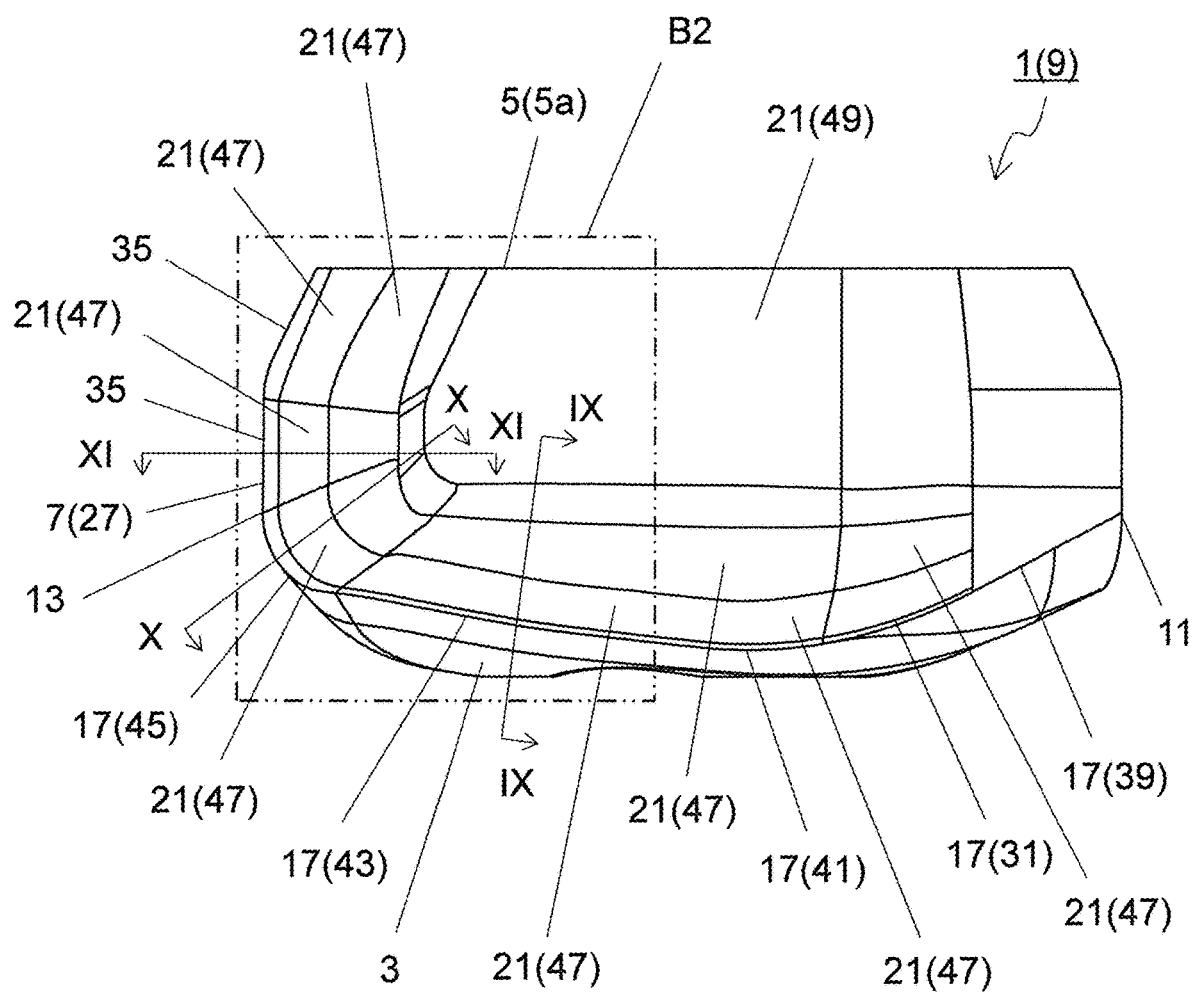
FIG. 4 is a side view of the cutting insert illustrated in FIG. 2 as viewed from A1 direction.

The first flat surface 49 may be located further away from the first cutting edge 31 and the third cutting edge 35 than the first inclined surface 47. The first flat surface 49 may be usable as a surface brought into contact with a pocket of the holder if fixing the insert 1 to the holder. The insert 1 may be stably fixable to the holder because the first flat surface 49 has a flat surface configuration. The first flat surface 49 may be inclined relative to the second surface 5, and may be orthogonal to the second surface 5 as illustrated in FIG. 4.

The second lateral surface 23 may include a second inclined surface 51 and a second flat surface 53. The second inclined surface 51 may be located along the second cutting edge 33 and the fourth cutting edge 37. The second inclined surface 51 may be inclined so as to come closer to the center of the base 9 as going away from the second cutting edge 33 and the fourth cutting edge 37, and may serve as a so-called rake surface. That is, the second inclined surface 51 may correspond to the second rake surface region described earlier.

Figure 5:
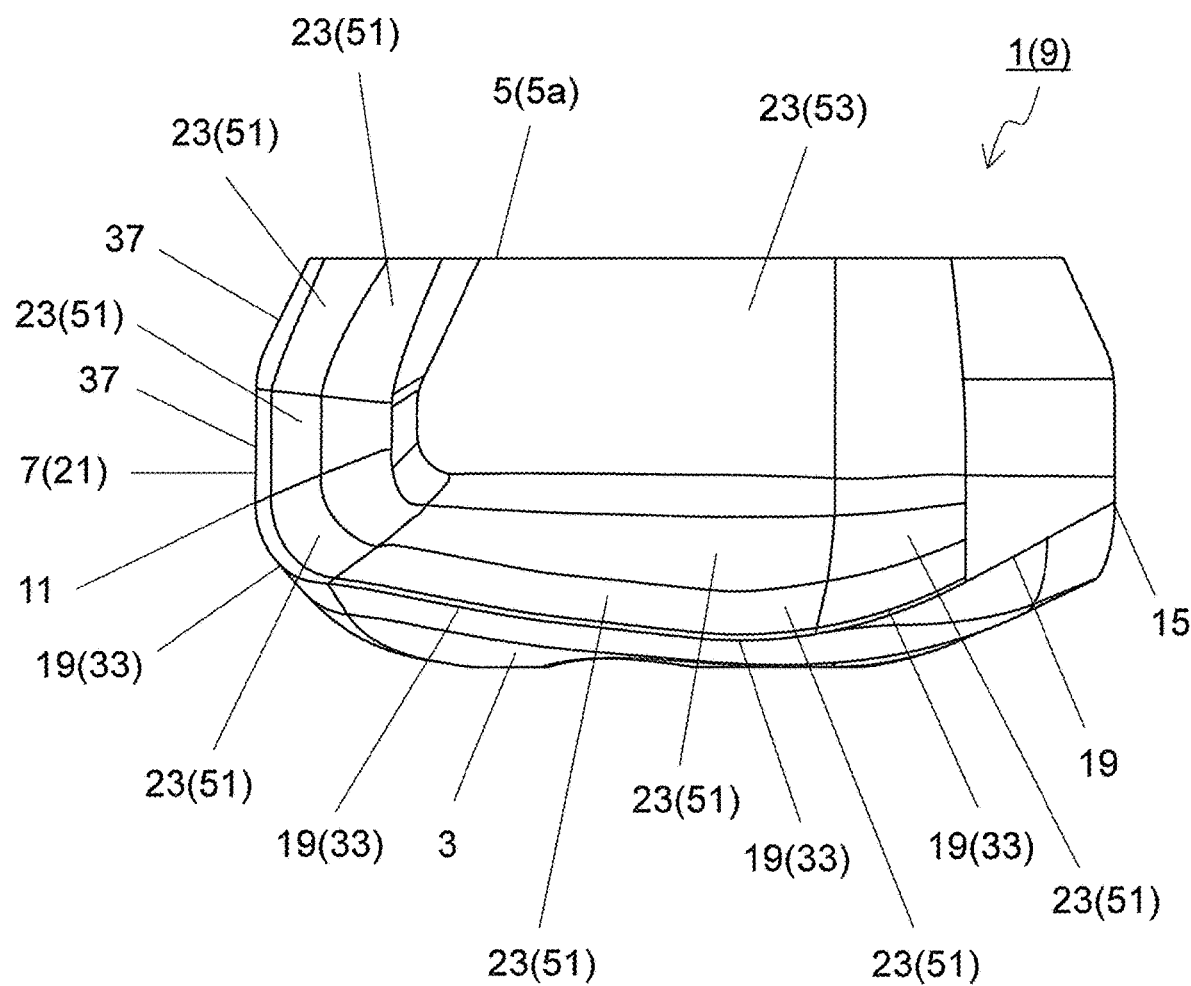
FIG. 5 is a side view of the cutting insert illustrated in FIG. 2 as viewed from A2 direction.
Figure 6:
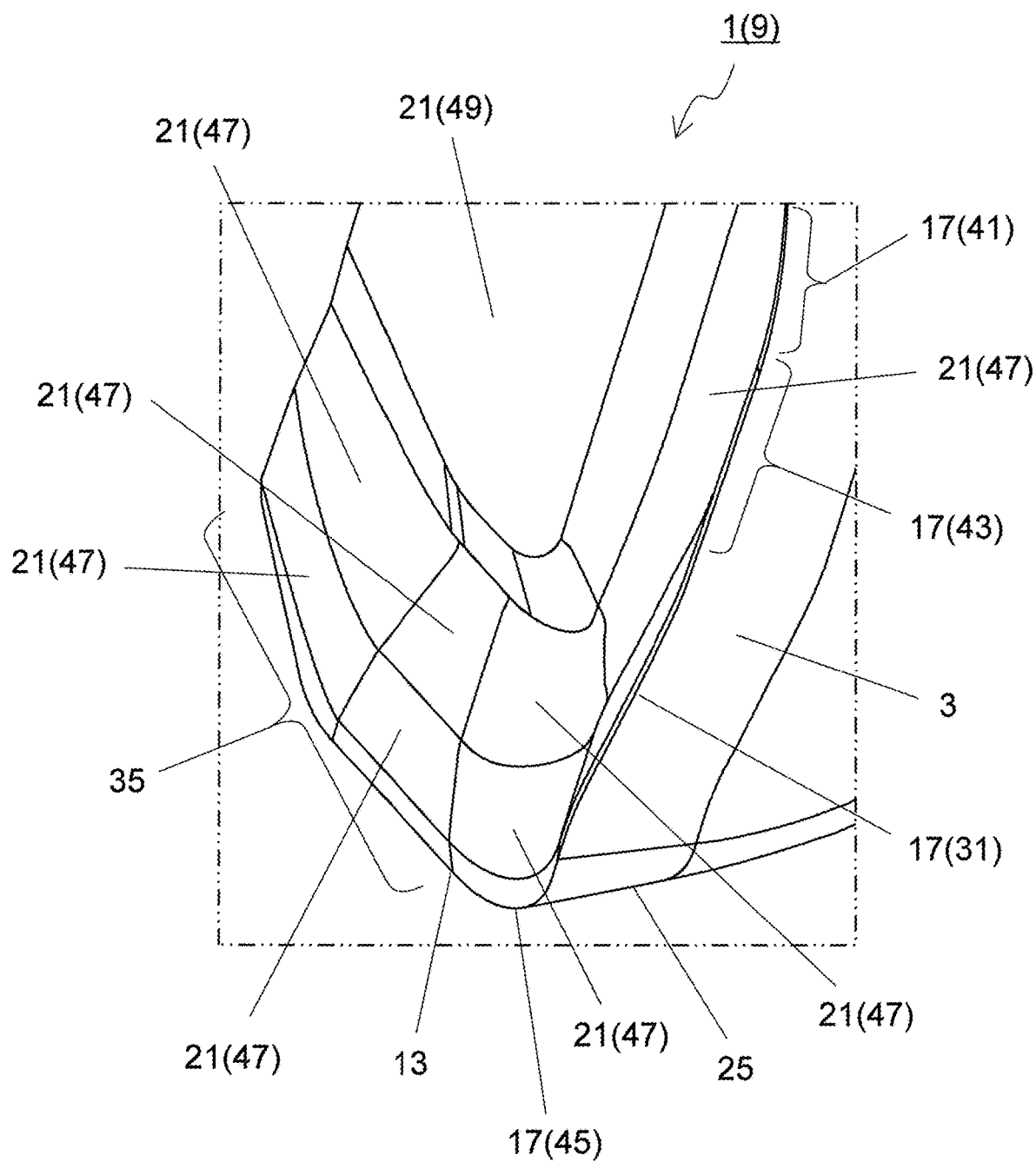
FIG. 6 is an enlarged view of a region B1 illustrated in FIG. 1.
Figure 7:
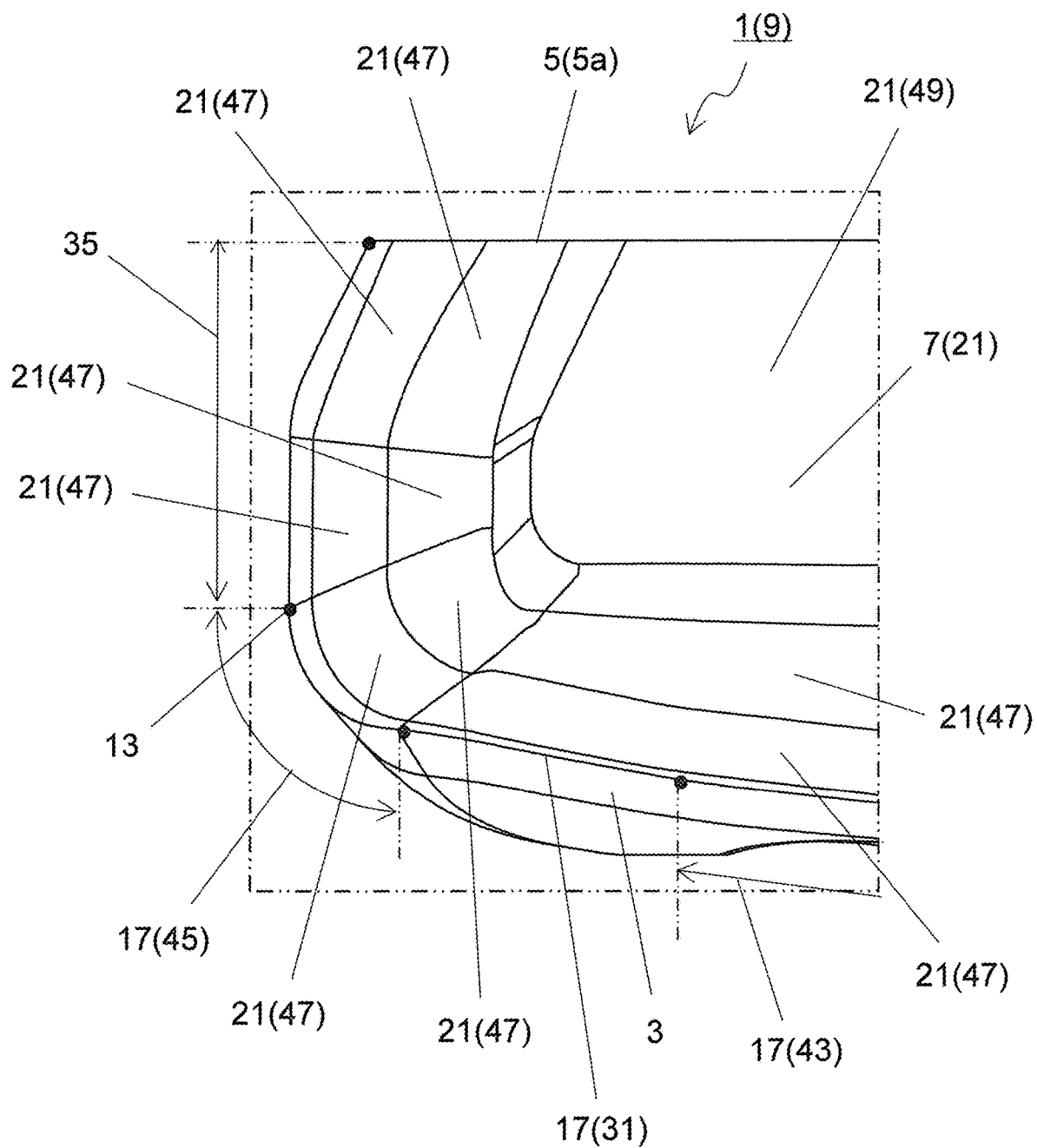
FIG. 7 is an enlarged view of a region B2 illustrated in FIG. 4.
Figure 8:
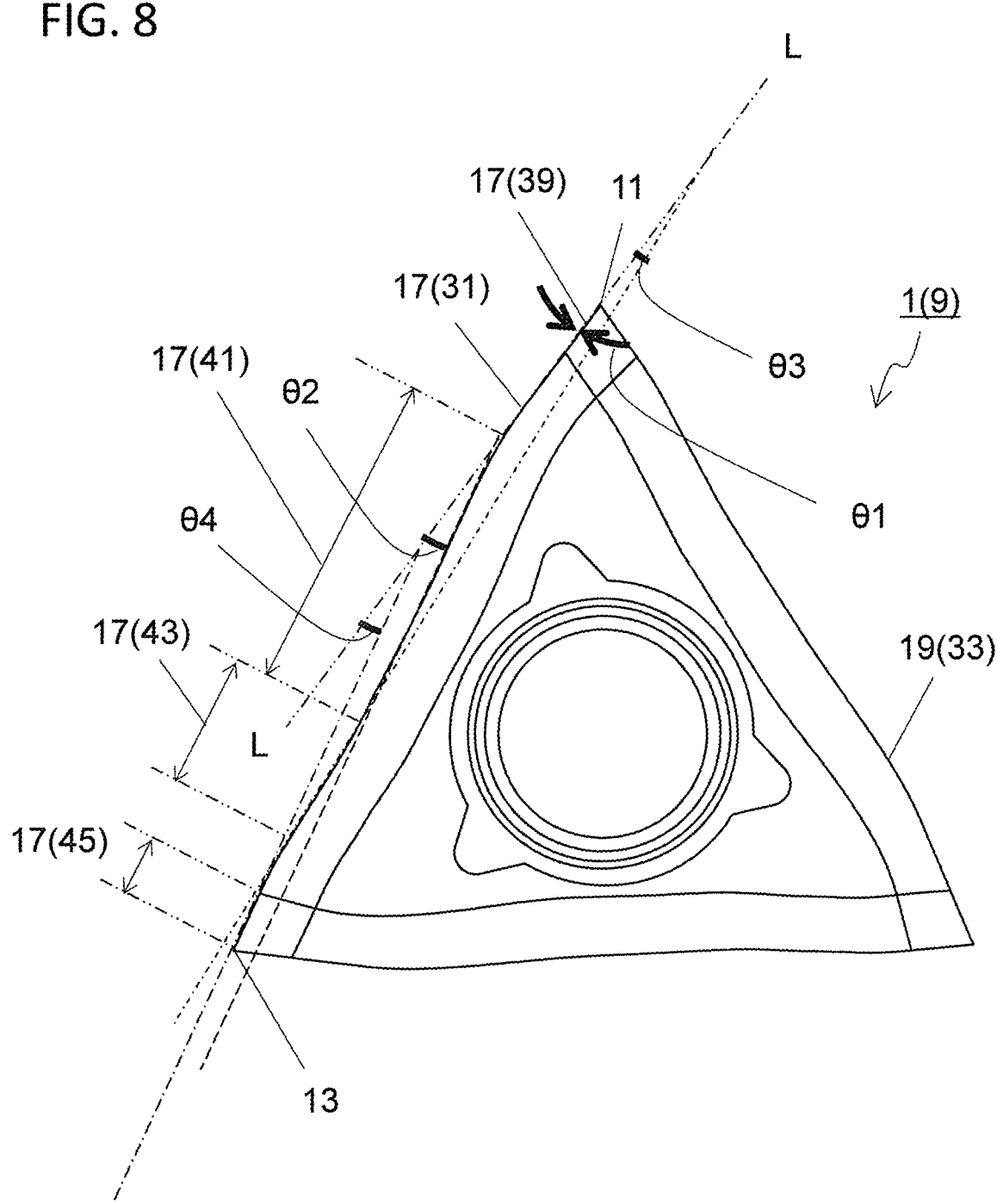
FIG. 8 is a side view that is the same as that of the cutting insert illustrated in FIG. 2.
Figure 9:
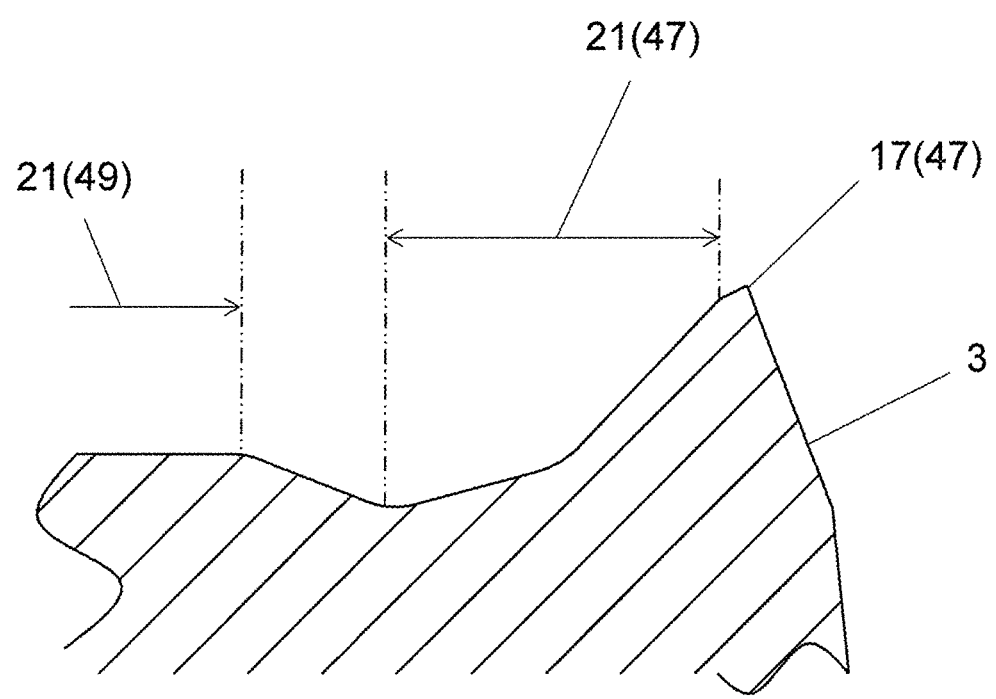
FIG. 9 is a sectional view taken along line IX-IX in the cutting insert illustrated in FIG. 4.
Figure 10:
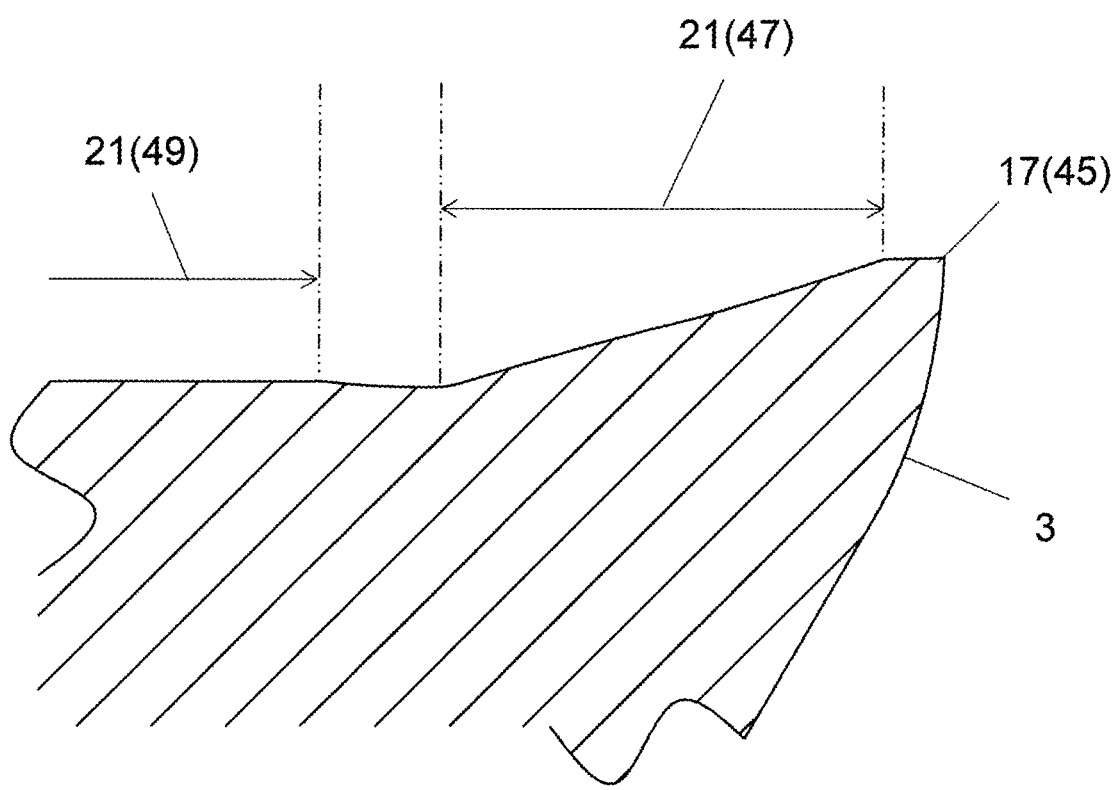
FIG. 10 is a sectional view taken along line X-X in the cutting insert illustrated in FIG. 4.
Figure 11:
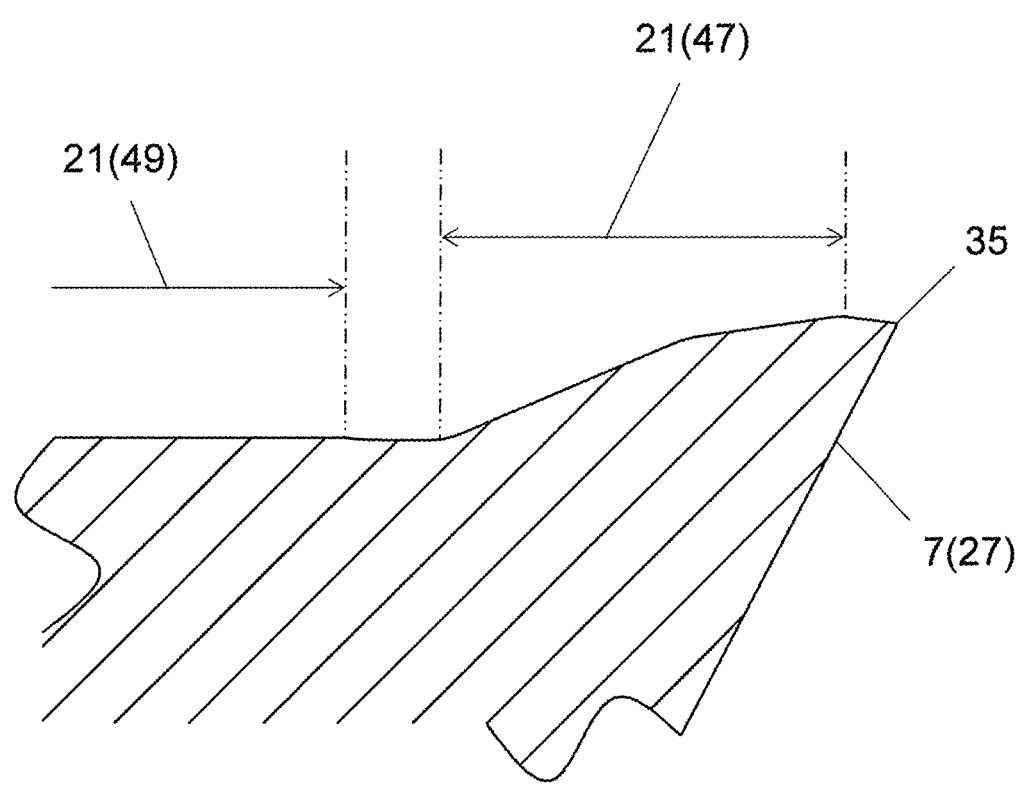
FIG. 11 is a sectional view taken along line XI-XI in the cutting insert illustrated in FIG. 4.

The second flat surface 53 may be located further away from the second cutting edge 33 and the fourth cutting edge 37 than the second inclined surface 51. The second flat surface 53 may be usable as a surface brought into contact with the pocket of the holder if fixing the insert 1 to the holder. The insert 1 may be stably fixable to the holder if the second flat surface 53 has a flat surface configuration. The second flat surface 53 may be inclined relative to the second surface 5, and may be orthogonal to the second surface 5 as illustrated in FIG. 5.

The first flat surface 49 and the second flat surface 53 are not limited to a strict flat surface. Similarly to the surface region 5*a*, the first flat surface 49 and the second flat surface 53 may include slight irregularities of approximately several tens of μm.

For example, cemented carbide and cermet may be usable as a material of the insert 1. Examples of composition of the cemented carbide may include WC—Co, WC—TiC—Co and WC—TiC—TaC—Co, in which WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). However, it is not intended to limit the material of the insert 1 to the above composition.

A surface of the insert 1 may be coated with a coating film by using chemical vapor deposition (CVD) method or physical vapor deposition (PVD) method.

Examples of composition of the coating film may include titanium carbide (TiC), titanium nitride (TiN), titanium carbonitride (TiCN) and alumina ($Al_2O_3$).

<Cutting Tools>

Figure 12:
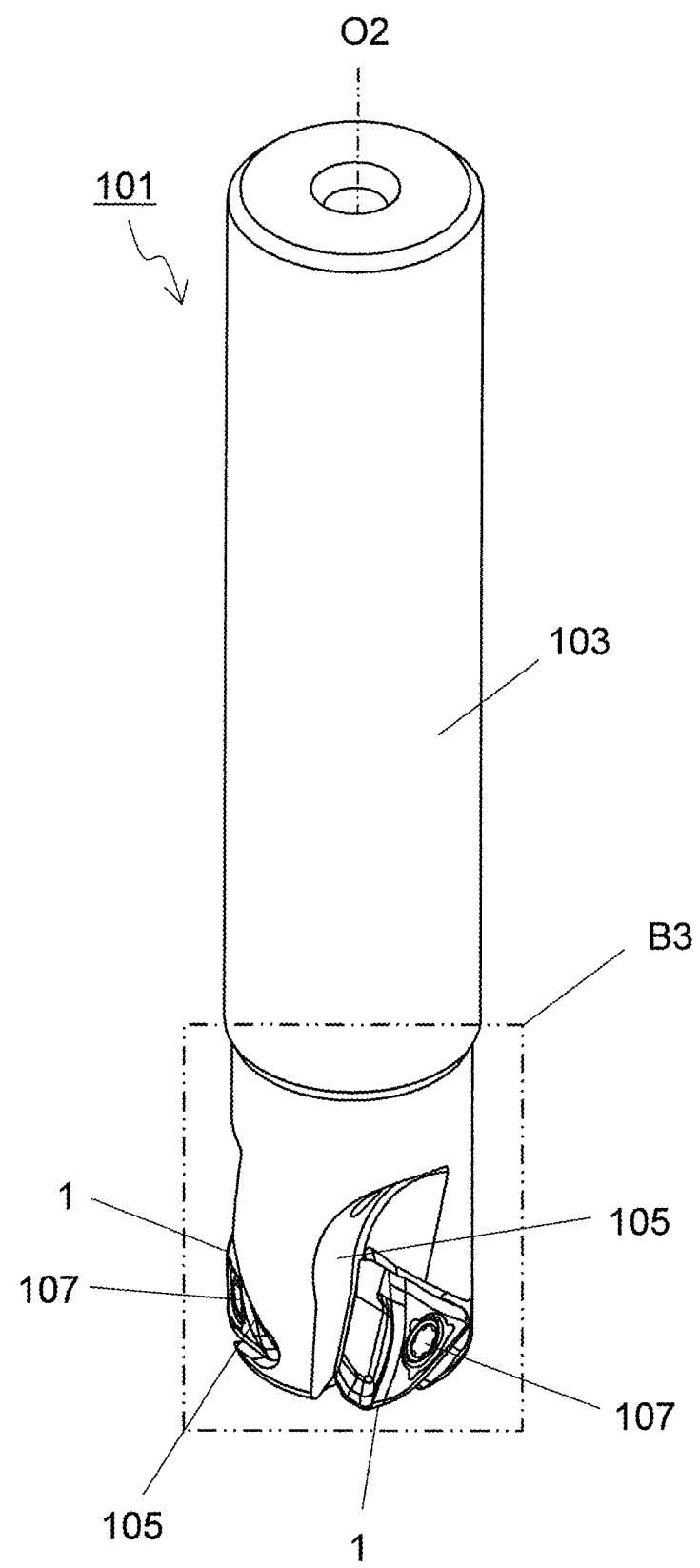
FIG. 12 is a perspective view illustrating a cutting tool in a non-limiting aspect of the present disclosure.
Figure 13:
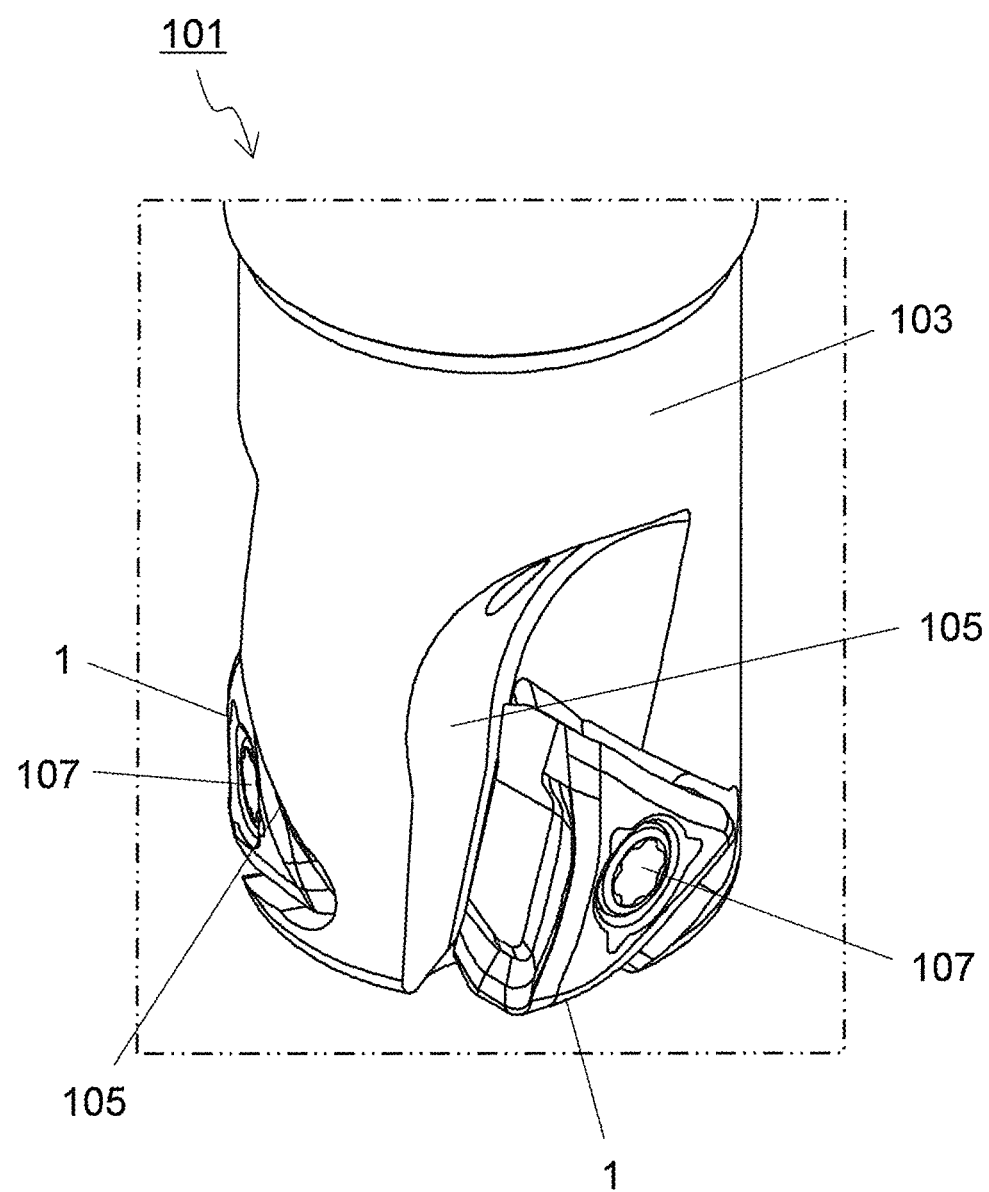
FIG. 13 is an enlarged view of a region B3 illustrated in FIG. 12.

Cutting tools 101 in embodiments may be described below with reference to FIGS. 12 and 13. FIGS. 12 and 13 may illustrate a state where the insert illustrated in FIG. 1 is attached to a pocket 105 of a holder 103 by a screw 107. A rotation axis O2 of the cutting tool 101 may be indicated by a two-dot chain line in FIG. 12 or the like.

The cutting tool 101 in a non-limiting embodiment may be used for a milling process. The cutting tool 101 may include the holder 103 and the insert as illustrated in FIG. 12. The holder 103 may have a columnar shape extended from a first end to a second end along the rotation axis O2. The holder 103 may include the pocket 105 located on a side of the first end. The insert may be located in the pocket 105.

The holder 103 may include only one pocket 105, or alternatively, a plurality of pockets 105 as in an embodiment illustrated in FIG. 12. If the holder 103 includes the pockets 105, the cutting tool 101 may include a plurality of inserts, and the inserts may be located one by one in the pockets 105.

The pocket 105 may open into an outer peripheral surface of the holder 103 and an end surface on a side of the first end. In cases where the holder 103 includes the pockets 105, these pockets 105 may be located at equal intervals or unequal intervals around the rotation axis O2. As apparent from, for example, the fact that the holder 103 includes the pockets 105, the holder 103 may not be a strict columnar shape.

The insert 1 may be attached to the pocket 105 so that at least a part of the cutting edge is protruded from the holder 103. Specifically, the insert 1 may be attached to the holder 103 so that the first cutting edge is located more outside than the outer peripheral surface in the holder, and the second cutting edge is protruded from the holder toward a workpiece.

The second flat surface on the second lateral surface and the second surface of the insert may be in contact with at least the holder 103 in the cutting tool 101 of the non-limiting embodiment.

The insert may be attached to the pocket 105 by the screw 107. The insert may be attached to the holder 103 by inserting the screw 107 into a screw hole of the insert, and by inserting a front end of the screw 107 into a screw hole formed in the pocket 105 so as to fix the screw 107 to the screw hole. For example, steel or cast iron may be usable as a material of the holder 103. Of these materials, steel may be particularly used from the viewpoint of enhancing toughness of the holder 103.

<Method for Manufacturing Machined Product>

Figure 14:
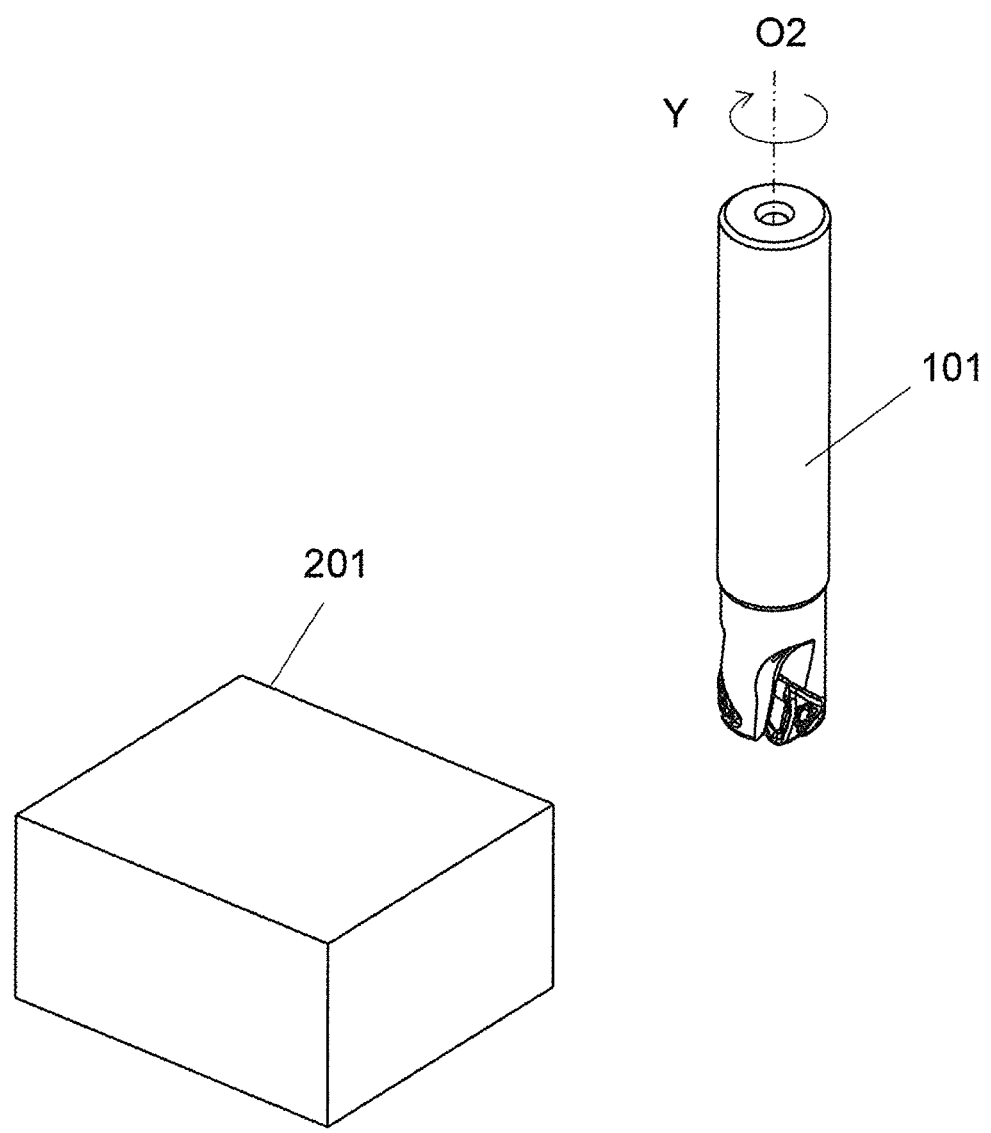
FIG. 14 is a schematic diagram illustrating one of steps in a method for manufacturing a machined product in a non-limiting aspect of the present disclosure.
Figure 15:
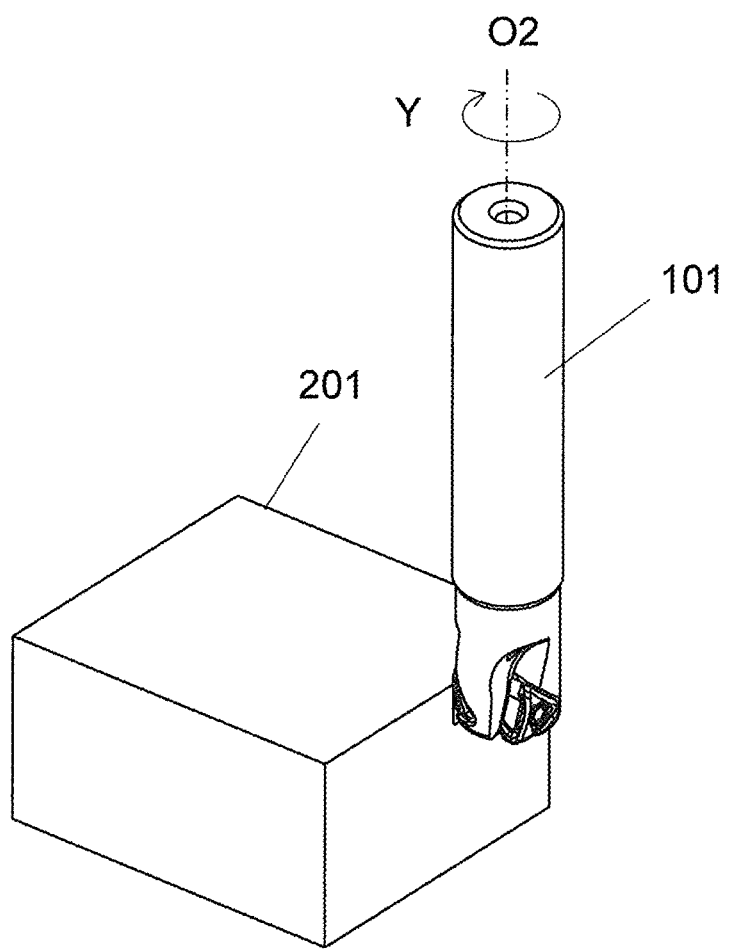
FIG. 15 is a schematic diagram illustrating one of the steps in the method for manufacturing a machined product in the non-limiting aspect of the present disclosure.
Figure 16:
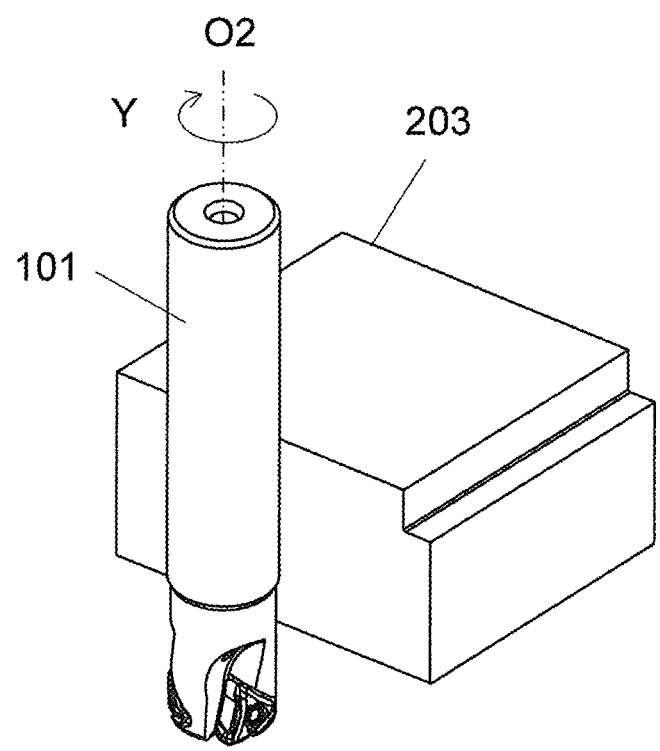
FIG. 16 is a schematic diagram illustrating one of the steps in the method for manufacturing a machined product in the non-limiting aspect of the present disclosure.

Methods for manufacturing a machined product in embodiments may be described below with reference to FIGS. 14 to 16. FIGS. 14 to 16 may illustrate a method for manufacturing a machined product in a cutting process using the above cutting tool. The rotation axis O2 of the cutting tool 101 may be indicated by a two-dot chain line as illustrated in FIGS. 14 to 16. The machined product 203 may be manufacturable by carrying out the cutting process of the workpiece 201. A manufacturing method of a non-limiting embodiment may include the following steps.

That is, the manufacturing method in the non-limiting embodiment may include:

(1) rotating the cutting tool 101 represented by the foregoing non-limiting embodiment;

(2) bringing the cutting tool 101 being rotated into contact with the workpiece 201; and (3) moving the cutting tool 101 away from the workpiece 201.

More specifically, firstly, the cutting tool 101 may be relatively brought near the workpiece 201 while rotating the cutting tool 101 in Y direction around the rotation axis O2 as illustrated in FIG. 14. The workpiece 201 may be then cut out by bringing the cutting edge of the cutting tool 101 into contact with the workpiece 201 as illustrated in FIG. 15. Thereafter, the cutting tool 101 may be relatively moved away from the workpiece 201 as illustrated in FIG. 16.

The workpiece 201 may be fixed and the cutting tool 101 may be brought near the workpiece 201. The workpiece 201 may be fixed and the cutting tool 101 may be rotated around the rotation axis O2 as illustrated in FIGS. 14 to 16. The workpiece 201 may be fixed and the cutting tool 101 may be moved away as illustrated in FIG. 16. In the above cutting process, the workpiece 201 may be fixed and the cutting tool 101 may be moved in each of the steps. However, it is not intended to limit to this embodiment.

For example, the workpiece 201 may be brought near the cutting tool 101 in the step (1). Similarly, the workpiece 201 may be moved away from the cutting tool 101 in the step (3). If it is desired to continue the cutting process, the step of bringing the cutting edge of the insert into contact with different portions of the workpiece 201 may be repeated while keeping the cutting tool 101 rotated.

Representative examples of material of the workpiece 201 may include carbon steel, alloy steel, stainless steel, cast iron and nonferrous metals.

The invention claimed is:

1. A cutting insert, comprising:
a base comprising
a first surface having a polygonal shape, a second surface located on a side opposite to the first surface, and
a lateral surface located between the first surface and the second surface, wherein
the first surface comprises
a first corner,
a second corner located adjacent to the first corner, and
a first side located between the first corner and the second corner,
the lateral surface comprises a first lateral surface which is located from the first side to the second surface and comprises a first rake surface region,
the first side, in a front view of the first surface, comprises
a first portion having a straight line shape and extended from the first corner toward the second corner,
a second portion having a straight line shape and located closer to the second corner than the first portion,
a third portion having a straight line shape and located closer to the second corner than the second portion, and
a fourth portion having a straight line shape and extended from the second corner toward the first corner,
in the front view of the first surface,
an imaginary straight line being in contact with and extending along the first portion is a reference line,
each of the second portion and the fourth portion is inclined relative to the reference line so as to extend away from the reference line in a direction extending away from the first portion,
an inclination angle of the first portion relative to the reference line is a first angle, an inclination angle of the second portion relative to the reference line is a second angle, an inclination angle of the third portion relative to the reference line is a third angle, and an inclination angle of the fourth portion relative to the reference line is a fourth angle,
the third angle is smaller than each of the second angle and the fourth angle, and
the fourth angle is larger than the second angle.

2. The cutting insert according to claim 1, wherein, in the front view of the first surface, the third portion is inclined relative to the reference line so as to extend away from the reference line in the direction extending away from the first portion.

3. The cutting insert according to claim 1, wherein
the first surface further comprises
a third corner located adjacent to the first corner, and
a second side located between the first corner and the third corner, and
the lateral surface further comprises a second lateral surface which is located from the second side to the second surface and comprises a second rake surface region.

4. The cutting insert according to claim 1, wherein
the base further comprises
a first cutting edge located on the first side,
a second cutting edge located on the second side,
a third cutting edge extended from the second corner toward the second surface, and
a fourth cutting edge extended from the first corner toward the second surface.

5. The cutting insert according to claim 4, wherein the first cutting edge is located at the second portion, the third portion and the fourth portion.

6. The cutting insert according to claim 5, wherein the fourth portion has a convex curvilinear shape in a front view of the first lateral surface.

7. The cutting insert according to claim 5, wherein, in a front view of the first lateral surface, the third portion is inclined so as to extend away from the second surface in a direction extending away from the fourth portion.

8. The cutting insert according to claim 5, wherein the second portion has a convex curvilinear shape in a front view of the first lateral surface.

9. The cutting insert according to claim 5, wherein, in a front view of the first lateral surface, the first portion is inclined so as to come closer to the second surface in a direction extending toward the first corner.

10. A cutting tool, comprising:
a holder which has a columnar shape extended from a first end to a second end along a rotation axis, and which comprises a pocket located on a side of the first end; and
the cutting insert according to claim 1, the cutting insert being configured to be located in the pocket.

11. A method for manufacturing a machined product, the method comprising:
rotating the cutting tool according to claim 10;
bringing the cutting tool being rotated into contact with a workpiece; and
moving the cutting tool away from the workpiece.

12. A cutting insert, comprising:
a base comprising
a first surface having a polygonal shape,
a second surface located on a side opposite to the first surface, and
a lateral surface located between the first surface and the second surface, wherein
the first surface comprises
a first corner,
a second corner located adjacent to the first corner, and
a first side located between the first corner and the second corner,
the lateral surface comprises a first lateral surface which is located from the first side to the second surface and comprises a first rake surface region,
the first side, in a front view of the first surface, comprises
a first portion having a straight line shape and extended from the first corner toward the second corner,
a second portion having a straight line shape and located closer to the second corner than the first portion,
a third portion having a straight line shape and located closer to the second corner than the second portion, and
a fourth portion having a straight line shape and extended from the second corner toward the first corner,
in the front view of the first surface,
an imaginary straight line being in contact with and extending along the first portion is a reference line,
each of the second portion and the fourth portion is inclined relative to the reference line so as to extend away from the reference line in a direction extending away from the first portion,
an inclination angle of the first portion relative to the reference line is a first angle, an inclination angle of the second portion relative to the reference line is a second angle, an inclination angle of the third portion relative to the reference line is a third angle, and an inclination angle of the fourth portion relative to the reference line is a fourth angle, the third angle is smaller than each of the second angle and the fourth angle, the first surface further comprises
a third corner located adjacent to the first corner, and
a second side located between the first corner and the third corner, the lateral surface further comprises a second lateral surface which is located from the second side to the second surface and comprises a second rake surface region, the base further comprises
a first cutting edge located on the first side,
a second cutting edge located on the second side,
a third cutting edge extended from the second corner toward the second surface, and
a fourth cutting edge extended from the first corner toward the second surface, the first cutting edge is located at the second portion, the third portion and the fourth portion, and the fourth portion has a convex curvilinear shape in a front view of the first lateral surface.

13. The cutting insert according to claim 12, wherein, in the front view of the first surface, the third portion is inclined relative to the reference line so as to extend away from the reference line in the direction extending away from the first portion.

14. The cutting insert according to claim 12, wherein, in the front view of the first lateral surface, the third portion is inclined so as to extend away from the second surface in a direction extending away from the fourth portion.

15. The cutting insert according to claim 12, wherein the second portion has a convex curvilinear shape in the front view of the first lateral surface.

16. The cutting insert according to claim 12, wherein, in the front view of the first lateral surface, the first portion is inclined so as to come closer to the second surface in a direction extending toward the first corner.

17. A cutting insert, comprising:
a base comprising
a first surface having a polygonal shape,
a second surface located on a side opposite to the first surface, and
a lateral surface located between the first surface and the second surface, wherein the first surface comprises
a first corner,
a second corner located adjacent to the first corner, and
a first side located between the first corner and the second corner, the lateral surface comprises a first lateral surface which is located from the first side to the second surface and comprises a first rake surface region, the first side, in a front view of the first surface, comprises
a first portion having a straight line shape and extended from the first corner toward the second corner,
a second portion having a straight line shape and located closer to the second corner than the first portion,
a third portion having a straight line shape and located closer to the second corner than the second portion, and
a fourth portion having a straight line shape and extended from the second corner toward the first corner, in the front view of the first surface,
an imaginary straight line being in contact with and extending along the first portion is a reference line,
each of the second portion and the fourth portion is inclined relative to the reference line so as to extend away from the reference line in a direction extending away from the first portion,
an inclination angle of the first portion relative to the reference line is a first angle, an inclination angle of the second portion relative to the reference line is a second angle, an inclination angle of the third portion relative to the reference line is a third angle, and an inclination angle of the fourth portion relative to the reference line is a fourth angle, the third angle is smaller than each of the second angle and the fourth angle, the first surface further comprises
a third corner located adjacent to the first corner, and
a second side located between the first corner and the third corner, the lateral surface further comprises a second lateral surface which is located from the second side to the second surface and comprises a second rake surface region, the base further comprises
a first cutting edge located on the first side,
a second cutting edge located on the second side,
a third cutting edge extended from the second corner toward the second surface, and
a fourth cutting edge extended from the first corner toward the second surface, the first cutting edge is located at the second portion, the third portion and the fourth portion, and in a front view of the first lateral surface, the third portion is inclined so as to extend away from the second surface in a direction extending away from the fourth portion.

18. The cutting insert according to claim 17, wherein, in the front view of the first surface, the third portion is inclined relative to the reference line so as to extend away from the reference line in the direction extending away from the first portion.

19. The cutting insert according to claim 17, wherein the second portion has a convex curvilinear shape in the front view of the first lateral surface.

20. The cutting insert according to claim 17, wherein, in the front view of the first lateral surface, the first portion is inclined so as to come closer to the second surface in a direction extending toward the first corner.

* * * * *